US010262020B2

(12) United States Patent
Cooper

(10) Patent No.: US 10,262,020 B2
(45) Date of Patent: Apr. 16, 2019

(54) METHOD FOR EFFECTIVE DATING OBJECT MODELS

(71) Applicant: ADP, LLC, Roseland, NJ (US)

(72) Inventor: Thomas A. Cooper, Sutton, MA (US)

(73) Assignee: ADP, LLC, Roseland, NJ (US)

( * ) Notice: Subject to any disclaimer, the term of this patent is extended or adjusted under 35 U.S.C. 154(b) by 345 days.

(21) Appl. No.: 15/041,914

(22) Filed: Feb. 11, 2016

(65) Prior Publication Data

US 2017/0235777 A1  Aug. 17, 2017

(51) Int. Cl.
*G06F 17/30* (2006.01)

(52) U.S. Cl.
CPC .. *G06F 17/30345* (2013.01); *G06F 17/30321* (2013.01); *G06F 17/30598* (2013.01)

(58) Field of Classification Search
CPC ............. G06F 19/328; G06F 17/30309; G06F 17/30321; G06F 17/30345; Y10S 707/99945; Y10S 707/99944
See application file for complete search history.

(56) References Cited

U.S. PATENT DOCUMENTS

| | | | | |
|---|---|---|---|---|
| 8,280,822 | B2 * | 10/2012 | McKeown | G06Q 10/067 705/1.1 |
| 8,640,103 | B2 | 1/2014 | Sheppard | |
| 8,954,935 | B2 | 2/2015 | Kew et al. | |
| 2002/0129348 | A1 * | 9/2002 | Kerpan | G06F 17/30607 717/170 |
| 2010/0100427 | A1 * | 4/2010 | McKeown | G06Q 10/067 705/322 |
| 2011/0209131 | A1 | 8/2011 | Hohenstein et al. | |
| 2011/0264565 | A1 | 10/2011 | Doherty et al. | |
| 2015/0006877 | A1 * | 1/2015 | Chiba | G06F 9/44505 713/100 |

FOREIGN PATENT DOCUMENTS

WO  WO2015013410 A2  1/2015

OTHER PUBLICATIONS

"Aspect-oriented programming," Wikipedia, the free encyclopedia, dated Dec. 4, 2015, 14 pages. https://en.wikipedia.org/wiki/Aspect-oriented_programming.
Bloom, "The Future of HRM Software: Effective Dating," Enterprise Irregulars, Apr. 23, 2010, 4 pages. http://www.enterpriseirregulars.com/16849/the-future-of-hrm-software-effective-dating/.
Kunjummen, "A Simple Introduction to AOP," Java Code Geeks, Jun. 21, 2012, 8 pages. http://www.javacodegeeks.com/2012/06/simple-introduction-to-aop.html.

* cited by examiner

*Primary Examiner* — Yuk Ting Choi
(74) *Attorney, Agent, or Firm* — Yee & Associates, P.C.

(57) ABSTRACT

An effective dater provides effective dating to object in a runtime environment. The effective dater identifies an access to a first field of a first object during runtime of a program. The first object is not effective date enabled. The effective date of determines whether the effective dating is to be applied to the first field. In response to determining that effective dating is to be applied to the first field, the effective dater redirects the access to a second object. The second object is effective date enabled. The effective dater then accesses the effective dated value in the second field of the second object according to an access context.

24 Claims, 9 Drawing Sheets

METHOD FOR EFFECTIVE DATING OBJECT MODELS

BACKGROUND INFORMATION

1. Field

The present disclosure relates generally to an improved computer system and, in particular, to a method for implementing an effective dating logic within applications on a computer system. Still more particularly, the present disclosure relates to a method and apparatus for implementing an effective dating logic during runtime of applications executing in a computer system.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to determine when to hire new employees, assign employees to projects, perform reviews for employees, and other suitable operations for the organization. As another example, a research department in the organization may use an information system to store and analyze information to research new products, perform reviews of employees, hire new employees, analyze products, or for other suitable operations.

Currently used information systems include databases. These databases store information about the organization. For example, these databases store information about employees, products, research, product analysis, business plans, and other information about the organization.

Information in databases can be accessed through a graphical user interface of a computer system. The information systems may be used in performing operations for an organization. The operations may include hiring operations and project assignments.

Information stored in databases can change over time. In order to maintain an accurate history of the information in a database, many applications have begun to institute effective dating logic for which a historical record is beneficial. Effective dating of information allows the application to store different values that are in effect for a particular data element over different time periods or date ranges. The values of second dated data element can change over time. When a data element has a particular value, that value is "in effect" for the data element. Effective dating refers to the date range over which a particular value is "in effect" for the data element. Effective dating therefore provides a record of changes to the value for a particular data element.

Through effective dating, an organization can then see how the data changes over time, and utilize these changes to perform operations for the organization. For example, a human resources Department within an operation he went to track various events within the course of employees career. For example, information that provides a historical record for such information as hiring date, transfers, promotions, salary history, dependencies give the organization a better overall view of the employee when utilizing information stored in the database to perform operations for the organization.

Developing and designing a method for effective dating information is important for the efficient performance of operations in an information system. Ideally, the effective dating system enhances the performance of operations for the organization by efficiently and easily presenting a historical record of the information which the organization can rely upon in performing operations.

However, the time and resources needed to provide effective dating within a given application may be greater than desired. Many legacy applications lack the original support for effective dating of data fields in their original object models. The object model dictates how to represent objects in storage. The best object model will maximize efficiency of frequent language operations while minimizing storage overhead. However, the design of current effective dating systems often results in a bloated object model, requiring significant computational resources and programming time. Therefore, implementing an effective dating system within application may require more time and resources than desired.

Therefore, it would be desirable to have a method and apparatus that take into account at least some of the issues discussed above, as well as other possible issues. For example, it would be desirable to have a method and apparatus that overcome a technical problem of implementing an effective dating logic within applications.

SUMMARY

An embodiment of the present disclosure provides a method for providing effective dating to objects in a runtime environment. A computer system identifies an access to a first field of a first object during runtime of a program. The first object is not effective date enabled. The computer system then determines if effective dating is to be applied to the first field. In response to determining that effective dating is to be applied to the first field, the computer system redirects the access to a second object. The computer system uses a second object to perform a lookup operation to find a set of values in effect for the first field of the first object according to an access context. The computer system then accesses the set of values in effect for the first field of the first object according to the access context.

Another embodiment of the present disclosure provides a computer system comprising a display system and an effective dater in communication with the display system. The effective dater identifies an access to a first field of a first object during runtime of a program. The first object is not effective date enabled. The effective dater then determines if effective dating is to be applied to the first field. In response to determining that effective dating is to be applied to the first field, The effective dater redirects the access to a second object. The effective dater uses the second object to perform a lookup operation to find a set of values in effect for the first field of the first object according to an access context. The effective dater then accesses the set of values in effect for the first field of the first object according to the access context.

Yet another embodiment of the present disclosure provides computer program product for providing effective dating to object runtime environment comprising a computer readable storage media, and first program code, second program code, third program code, fourth program code, and fifth program code stored on the computer readable storage media. The first program code identifies access to a first field of the first object during runtime of a program. The first object is not effective date enabled. The second program code determines if effective dating is to be applied to the first field. The third program code redirects the access to a second object in response to determining that effective dating is to be applied to the first field. The fourth program code uses the second object to perform a lookup operation to find a set of values in effect for the first field of the first object according to an access context. The fifth program code then accesses the set of values in effect for the first field of the first object according to the access context.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that one manner in which presenting information in a graphical user interface may be performed more efficiently is to use effective dating for the data sets. The illustrative embodiments also recognize and take into account that improvements may be made to the manner in which effective dating is implemented for different data sets.

Those embodiments recognize and take into account that some organizations may desire to implement effective dating logic into a legacy application that does not natively support effective dating. In particular, an organization may wish to effectively date information in order to provide aid historical overview of information such that operations can be performed for the benefit of the organization. Those embodiments recognize and take into account that effective dating of organizational information is desirable such that operations can be performed and information can be accessed more efficiently and easily that gives an overall historical view of the data relied upon in performing those operations.

Thus, the illustrative embodiments provide a method and apparatus for providing effective dating to object runtime environment. The process, in one illustrative example, identifies and access to a first field of a first object during runtime of a program. The first object is not effective date enabled. The process then determines if effective dating is to be applied to the first field. In response to a determination that effective dating is to be applied to the first field, the process redirects the access to a second object. The second object is effective date enabled. The process then accesses the effective dated value in a second field of the second object according to an access context.

Figure 1:
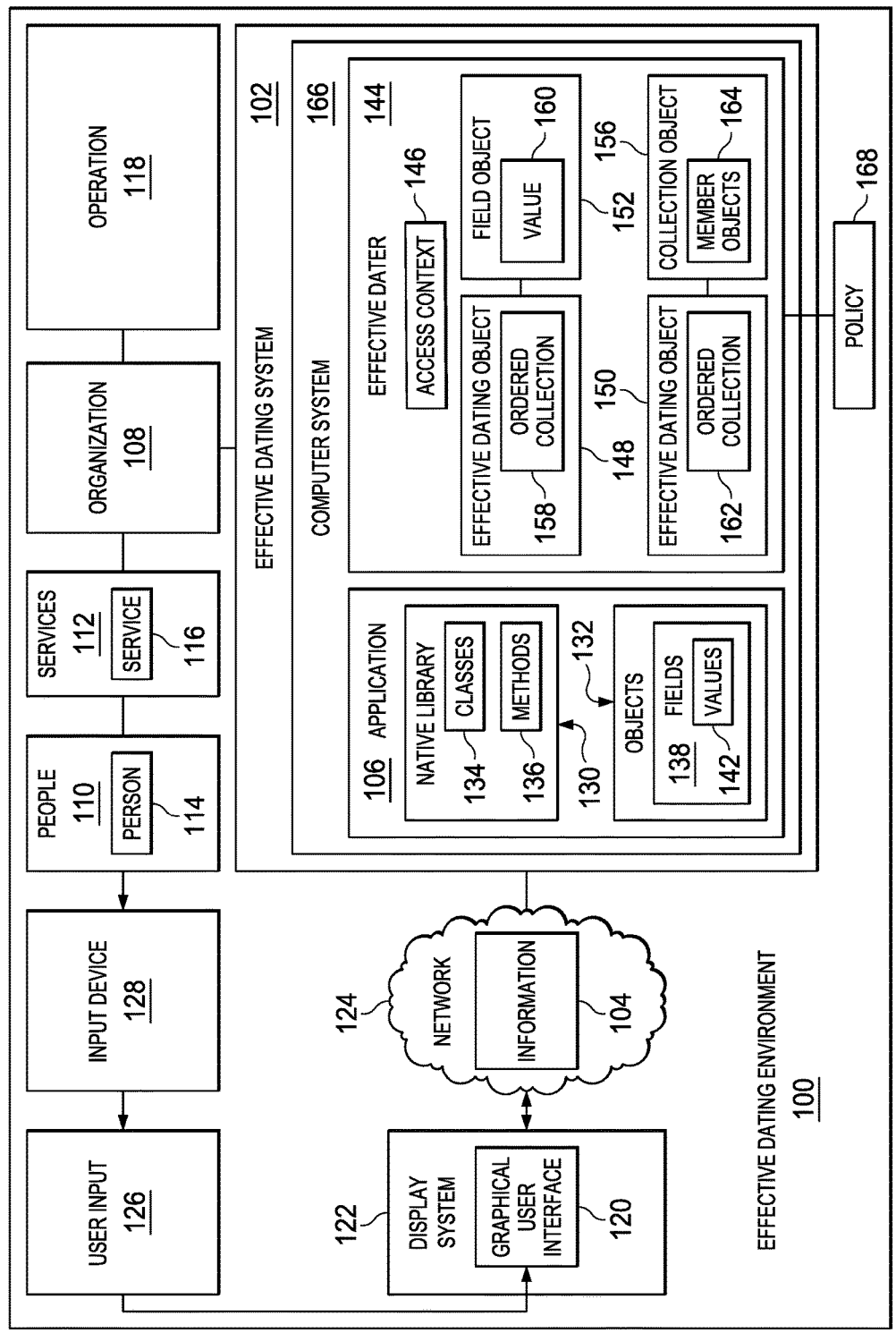
FIG. 1 is an illustration of a block diagram of an effective dating environment depicted in accordance with an illustrative embodiment.

With reference now to the figures and, in particular, reference to FIG. 1, an illustration of a block diagram of an effective dating environment is depicted in accordance with an illustrative embodiment. In this illustrative example, effective dating environment 100 includes effective dating system of 102. The effective dating system 102 provides access to information 104 through application 106. The access of data may be at least one of reading, writing, modifying, storing, or deleting information 104.

Information 104 may be information about organization 108. Information 104 may be information for at least one of people, products, services, business plans, performance reviews, payroll, human resources, benefits administration, business plans, marketing, research, product development, or other suitable information.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, organization 108 may be, for example, a corporation, a partnership, a charitable organization, a city, a government agency, or some other suitable type of organization. People 110 may be employees of organization 108. In other illustrative examples, people 110 may be members of organization 108 without being employees.

Information 104 may be information about people 110. In one illustrative example, organization 108 uses application 106 to access information 104 about people 110.

In one illustrative example, organization 108 accesses information 104 about person 114. Person 114 is one of people 110. Person 114 can be, for example a payroll service of organization 108, benefits administration service of organization 108, product development service of organization 108, marketing services of organization 108, or other suitable information in information 104.

Services 112 may be services provided by organization 108. In other illustrative examples, services 112 may be services provided for the benefit of organization 108.

Information 104 may be information about services 112. In one illustrative example, organization 108 uses application 106 to access information 104 about services 112.

In one illustrative example, organization 108 accesses information 104 about service 116. Service 116 is one of services 112. Service 116 can be, for example a payroll service of organization 108, benefits administration service of organization 108, product development service of organization 108, marketing services of organization 108, or other suitable information in information 104.

Information 104 can be stored on network 124. Network 124 is located in at least one of effective dating system 102 or outside of effective dating system 102. For example, network 124 may include at least one of a local area network (LAN), a wide area network (WAN), the Internet, an intranet, or some other suitable type of network.

In one illustrative example, organization 108 accesses information 104 through application 106 to perform operation 118. Application 106 is a software program that maintains information 104 for organization 108. In one illustrative example, an operator for organization 108 can interact with application 106 through graphical user interface 120 displayed on display system 122.

Graphical user interface 120 is displayed on display system 122 and provides visualization of information 104 through application 106. In this illustrative example, graphical user interface 120 is displayed on display system 122.

As depicted, display system 122 is a hardware system and includes one or more display devices on which graphical user interface 120 may be displayed. The display devices may include at least one of a light emitting diode display (LED), a liquid crystal display (LCD), an organic light emitting diode display (OLED), or some other suitable device on which graphical user interface 120 can be displayed. The user (not shown) may interact with graphical user interface 120 through user input 126 generated by input device 128. Input device 128 may be, for example, a mouse, a keyboard, a trackball, a touchscreen, a stylus, or some other suitable type of input device.

As illustrated, application 106 includes native library 130 and objects 132. Native library 130 is a collection of resources used by effective dating system 102 to execute application 106. Native library 130 can include, for example but limited not to, configuration data, documentation, help data, message templates, methods, subroutines, and specifications. As depicted, native library 130 includes classes 134 and methods 136.

Objects 132 are instances of classes 134. Application 106 represents information 104 as objects 132. As depicted, objects 132 include fields 138. Fields 138 are variables that hold values 142 for objects 132. Values 142 of fields 138 define the state of objects 132.

In one illustrative example, objects 132 are not configured to implement effective dating of information 104. Therefore, changes to values 142 for fields 138 of objects 132 will not preserve the original values of fields 138.

Effective dater 144 may be used to add effective dating capabilities to application 106 for the effective dating of objects 132. As depicted, effective dater 144 has a number of different components. As used herein, a "number of items" means one or more items. For example, "a number of different components" means one or more components. As depicted, effective dater 144 includes an access context 146, effective dating object 148, effective dating object 150, field object 152, and collection object 156.

As depicted, access context 146 is a date or date range that allows effective dater 144 to retrieve a corresponding value 160 from field object 152. Additionally, access context 146 allows effective dater 144 to retrieve member objects 164 from collection object 156, thereby maintaining effective dated membership in a collection.

Effective dater 144 generates effective dating object 148, effective dating object 150, field object 152, and collection object 156. Effective dater 144 intercepts accesses to at least one of objects 132 or fields 138 by application 106 and redirects those accesses to field object 152 or collection object 156 according to access context 146.

Effective dater 144 uses effective dating object 148 to locate field object 152, according to access context 146. As depicted, effective dating object 148 includes ordered collection 158. Ordered collection 158 maintains effective dated values for a corresponding property type field.

Field object 152 is an object that holds value 160. Value 160 is value that is in effect over access context 146.

Effective dater 144 uses effective dating object 150 to locate collection object 156, according to access context 146. As depicted, effective dating object 150 includes ordered collection 162. Ordered collection 162 maintains effective dated object membership for a corresponding collection type field.

Collection object 156 is an object that implements a set interface and stores member objects 164 in effect for a particular access context 146. Member objects 164 are one or more objects that are in effect over access context 146.

As depicted, effective dater 144 may be implemented in software, hardware, firmware or a combination thereof. When software is used, the operations performed by effective dater 144 may be implemented in program code configured to run on hardware, such as a processor unit. When firmware is used, the operations performed by effective dater 144 may be implemented in program code and data and stored in persistent memory to run on a processor unit. When hardware is employed, the hardware may include circuits that operate to perform the operations in effective dater 144.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, effective dater 144 may be implemented in computer system 166. Computer system 166 is a hardware system that includes one or more data processing systems. When more than one data processing system is present, those data processing systems may be in communication with each other using a communications medium. The communications medium may be a network, such as network 124. The data processing systems may be selected from at least one of a computer, a server computer, a tablet, or some other suitable data processing system.

During runtime, application 106 accesses fields 138 of object 132 through method calls of method 136, or through direct access of object 132 or fields 138, bypassing methods 136. According to one illustrative embodiment, effective dater 144 does not intercept method calls themselves. Instead, effective dater 144 intercepts lower-level field accesses of fields 138, and diverts them to field object 154 using effective dating object 148.

In the illustrative example, when fields 138 is a property type field, effective dater 144 diverts accesses to fields 138 by application 106 to field object 152 according to access context 146. Therefore, effective dater 144 causes application 106 to retrieve value 160 according to access context 146, instead of values 142. In this manner, effective dater 144 enables different values 160 stored in different ones of field object 152 to be in effect over different ones of access context 146.

In one illustrative example, the presence of a link from object 132 to the members of the collection is itself a form of mutable state. Therefore, it may be desirable to provide effective dating capabilities that track associations between objects 132 and fields 138, when field 138 references a collection whose membership may change over time.

When field 138 is a collection, application 106 accesses object 132 during runtime through method calls of method 136, or through direct access of object 132 or fields 138, bypassing methods 136. According to one illustrative embodiment, effective dater 144 does not intercept method calls themselves. Instead, effective dater 144 intercepts lower-level field accesses of fields 138, and diverts them to collection object 156 using effective dating object 150.

In the illustrative example, effective dater 144 diverts accesses to fields 138 by application 106 to collection object 156 according to access context 146. Collection object 156 is a collection that includes one or more of member objects 164. Each of member objects 164 is an object that is a member of a collection in effect for access context 146. Therefore, effective dater 144 causes application 106 to retrieve member objects 164 according to access context 146, retrieving all member objects 164 that are in effect over access context 146.

When accessed according to a particular access context, effective dater 144 establishes current date range. Effective dated object 148 looks to a date range established by access context 146 to select at least one value 160 from at least one of field object 152 to operate on. Effective dating object 150 looks to the date range established by access context 146 to identify one or more of member objects 164 that are in effect for the effective dated collection during the date range established by access context 146.

In this manner, effective dater 144 enables membership of member objects 164 in a collection type of field 138 to itself be mutable and effectively dated. When field 138 is a collection, accesses to field 138 are redirected to collection object 156 according to access context 146. Effective dater 144 therefore enables effective dated mutable membership the collection, allowing different member objects 164 to be in effect in different ones of collection object 156 over different ones of access context 146.

In operation, effective dater 144 in computer system 166 provides a method for providing effective dating to objects in the runtime environment by intercepting access to objects 132 that are not effective dated, and diverting those accesses to one of field object 152 that contain value 160 and collection object 156 that contains member objects 164. As a result, effective dating is maintained across all date ranges by effective dater 144 accessing different ones of field object 152 and collection object 156 according to access context 146.

As a result, effective dating is implemented by effective dater 144 for information 104 through intercept of accesses to fields 138 of object 132 and redirect to at least one of field object 152 and collection object 156 via at least one of effective dating object 148 and effective dating object 150 according to access context 146. Information 104 stored in at least one of field object 152 and collection object 156 may be relied upon to perform operations 118 for organization 108 more efficiently and easily based on the historical overview of information 104 provided by the effective dating by effective dater 144.

The illustrative example in FIG. 1 and the examples in the other subsequent figures provide one or more technical solutions to overcome a technical problem of defective dating of information within applications and legacy applications that make for the efficient performance of operations in an information system more cumbersome and time-consuming than desired. For example, effective dater 144 diverts all access to fields 138 by application 106 to at least one of field object 152 and collection object 156 according to access context 146 when organization 108 desires to provide effective dating for information 104 represented in fields 138 for object 132.

In this manner, the use of effective dater 144 has a technical effect of reducing time, effort, or both in providing effective dating for application 106. In this manner, operation 118 performed for organization 108 may be performed more efficiently as compared to currently used systems. For example, field object 152 may be used to store values 160 corresponding to a particular access context 146, enabling more efficient performance of operation 118, selected from at least one of hiring, benefits administration, payroll, performance reviews, forming teams for new products, assigning research projects, or other suitable operations for organization 108.

As a result, computer system 166 operates as a special purpose computer system in which effective dater 144 in computer system 166 enables effective dating for information 104. For example, effective dater 144 enables diverting of access to fields 138 from objects 132 to at least one of effective dating object 148 and effective dating object 150 when effective dater 144 identified fields 138 as meeting one or more rules in policy 168. For example, a read or write operation of field 138 that has a signature or annotation matching one or more rules in policy 168 may be identified by effective dater 144 and diverted to at least one of field object 152 or collection object 156 only when that signature or annotation meets one or more rules in policy 168 defining which of information 104 should be effective dated.

Thus, effective dater 144 transforms computer system 166 into a special purpose computer system as compared to currently available general computer systems that do not have effective dater 144. Currently used general computer systems do not reduce the time or effort needed to implement effective dating for information 104 of application 106.

Figure 2:
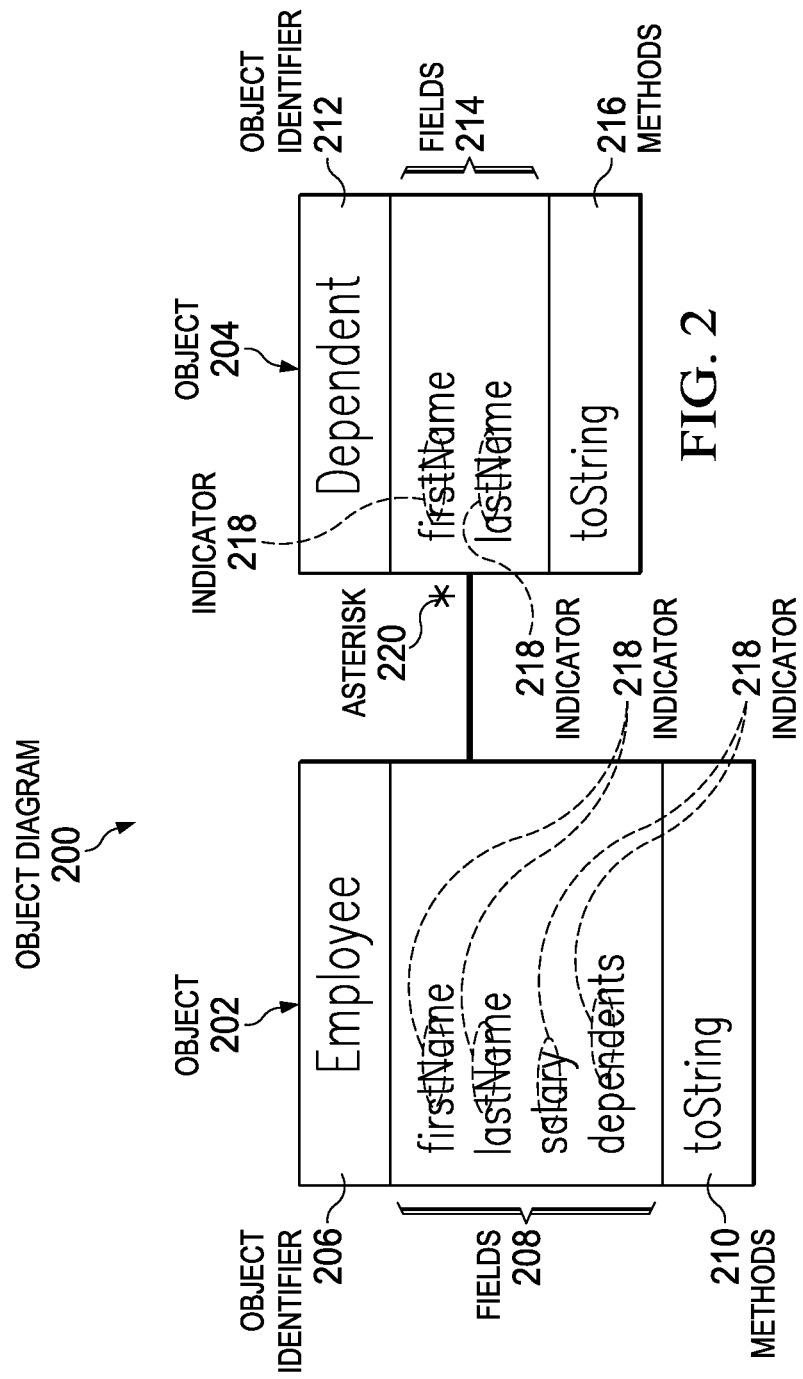
FIG. 2 is an object diagram illustrating a partial view of a model system depicted in accordance with an illustrative embodiment.

With reference now to FIG. 2, an object diagram illustrating a partial view of a model system is depicted according to an illustrative embodiment. Object diagram 200 is a graph illustrating key links between instances of a particular set of objects and their attributes.

In the illustrative examples, the same reference numeral may be used in more than one figure. This reuse of a reference numeral in different figures represents the same element in the different figures.

As depicted, object diagram 200 has a number of different components. As used herein, a "number of items" means one or more items. For example, "a number of different components" means one or more components. As depicted, object diagram 200 includes object 202 and object 204.

Object 202 an example of object 132, depicted in block form in FIG. 1. Object 202 includes object identifier 206, fields 208, and methods 210. In this illustrative example, object identifier 206 is "Employee."

Object 202 includes fields 208. Fields 208 are examples of fields 138, depicted in block form in FIG. 1. As depicted, fields 208 includes fields identified by the field names "first name," "last name," "salary," and "dependents."

Object 202 includes methods 210. Method 210 are examples of methods 136, depicted in block form in FIG. 1. As depicted, methods 210 includes the method "toString."

Object 204 is an example of object 132, depicted in block form in FIG. 1. Object 204 includes object identifier 212, fields 214, and methods 216. In this illustrative example, object identifier 212 is "dependent." Object 204 is an object as identified and constrained by the named "dependents" field of fields 208 of object 202. The "dependents" field of fields 208 of object 202, pointed to by indicator 218, is a collection of references to dependents an employee, which can be person 114 depicted in block form in FIG. 1. In this illustrative example, the references are indicated in this diagrammatic notation as a line connecting object 202 with object 204, with an asterisk 220 on the side where cardinality is more than one.

Object 204 includes fields 214. Fields 214 are examples of fields 138, depicted in block form in FIG. 1. As depicted, fields 214 includes the fields identified by the field names "first name," and "last name."

Object 204 includes methods 216. Methods 216 are examples of methods 136, depicted in block form in FIG. 1. As depicted, methods 216 includes the method "toString."

As depicted, the association between object 202 and object 204 has been marked by asterisk 220. Asterisk 220 is a diagramming notation that indicates this is a 1-to-many relationship. Therefore, object 202 can have the indicated association with object 204, as well as other possible "dependent" objects.

In this illustrative example, an organization, such as organization 108, depicted in block form in FIG. 1, may wish to provide effective dating capabilities to one or more of fields 208 and fields 214. In this illustrative example, one of fields 208 and fields 214 that are to be provided with effective dating capabilities are marked with indicator 218, depicted in FIG. 2.

In the illustrative example, marking fields 208 and fields 214 with indicators 218 causes the effective dating code to intercept all accesses, including receipts and assignments, to fields 208 and fields 214. Effective dater 144, depicted in block form in FIG. 1, redirects those accesses to an effective dated object, such as at least one of effective dating object 148 or effective dating object 150, of depicted in block form in FIG. 1. Then, a corresponding one of field object 152 or collection object 156 that holds distinct values across all time can be accessed to determine values in effect according to access context 146.

In the illustrative example, marking the "dependents" field of fields 208 of object 202 with indicator 218 causes effective dater 144, depicted in block form in FIG. 1 to intercept all accesses, including receipts and assignments, to the "dependents" field of fields 208 of object 202. Instead of performing a read/write on one of fields 208 or 214 when an application, such as application 106 depicted in block form in FIG. 1, accesses the "dependents" field of fields 208 of object 202, the access is redirected to an effective dating object, such as effective dating object 150, depicted in block form in FIG. 1.

For each of the collection type fields of fields 208, effective dater 144, depicted in block form in FIG. 1, substitutes a number of ordered collections, such as ordered collections 162 depicted in block form in FIG. 1. For each of the property type fields of fields 208, effective dater 144 substitutes a number of ordered collections, such as ordered collections 158, depicted in block form in FIG. 1. Marking fields 208 and fields 214 with indicator 218 redirects access to a corresponding value that is in effect according to an access context, such as access context 146, depicted in block form in FIG. 1.

Whenever a mutation is performed with respect to object 204, including any additions or removals, effective dater 144 respects the current date context, as indicated by access context 146 shown in block form in FIG. 1. Effective dater 144 redirects those accesses to an effective dated ordered collection of objects, such as ordered collection 162 depicted in block form in FIG. 1, and manages membership in the collection. Any access to object 204 reads only those objects that are in effect during a date range indicated by access context 146.

Figure 3:
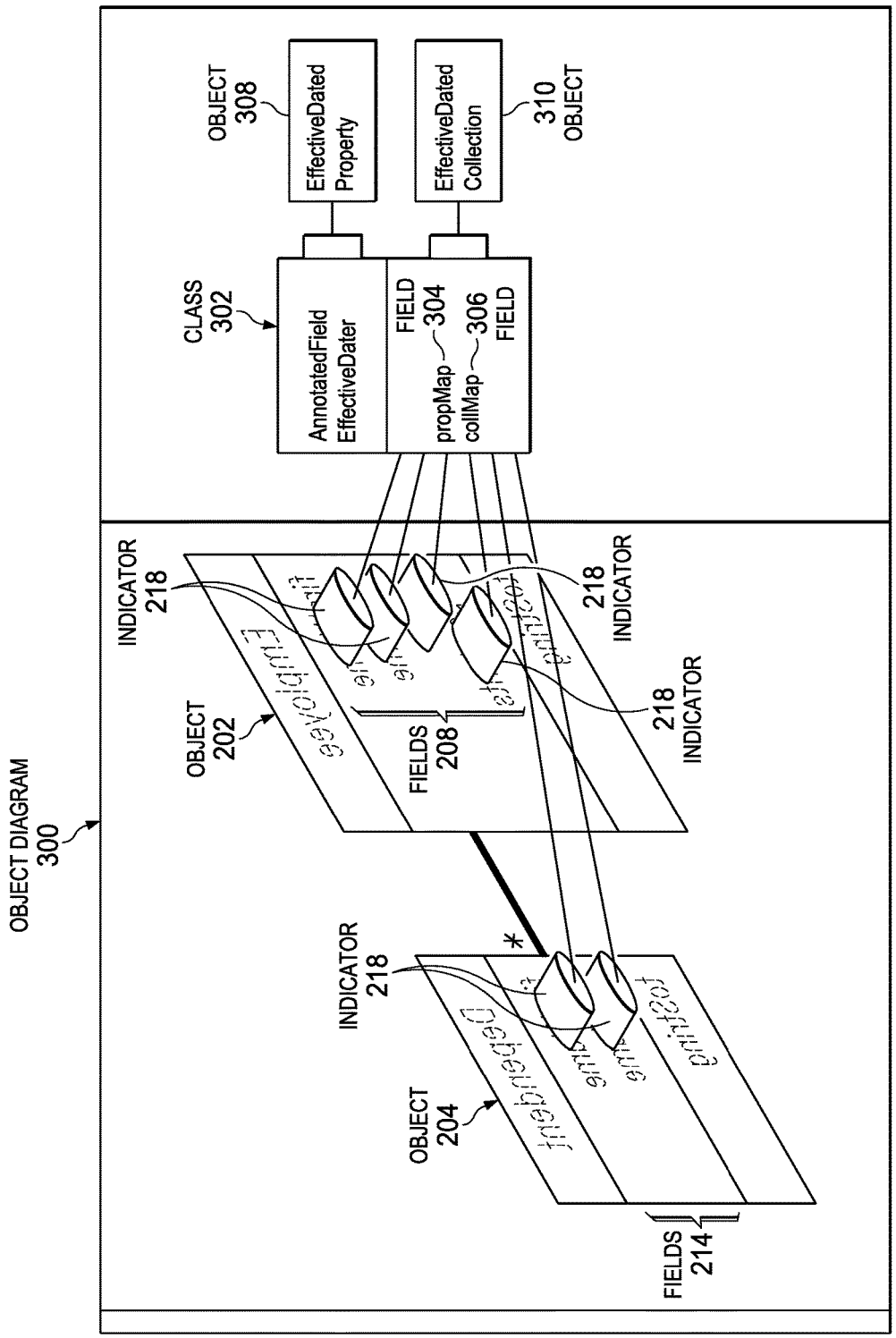
FIG. 3 is an object diagram conceptually illustrating the intercept of access to objects that are not effectively dated depicted in accordance with an illustrative embodiment.

With reference now to FIG. 3, an object diagram conceptually illustrating the intercept of access to objects that are not effective dated is depicted according to an illustrative example. As depicted, object diagram 300 conceptually depicts intercepts by effective dater 144, depicted in block form in FIG. 1, of access to fields 208 of object 202 and fields 214 of object 204.

As depicted, object diagram 300 includes "annotated field effective dater" class 302. In this illustrative example, class 302 provides a unit of modularity for crosscutting concerns for the implementation of effective dating. In this illustrative example, class 302 is an implementation of an aspect, that defines well-defined points in program flow for access and update of fields, such as fields 208 and 214 of FIG. 2, marked with an annotation, which can be, for example, indicator 218 of FIG. 2. In this illustrative example, accesses to at least one of fields 208, fields 214, and object 204 are so defined because they are marked with indicator 218.

As depicted, class 302 includes a number of different components. As depicted, class 302 includes "propMap" field 304, and "collMap" field 306.

For each object that is not provided with effective dating capabilities, such as objects 132 depicted in block form in FIG. 1, effective dater 144 creates an instance of class 302. Each instance holds two maps: effective dated properties map and effective dated collections map.

"PropMap" field 304 provides a map for determining effective dated objects of property type fields, such as at least one property type fields of fields 208 and fields 214. Effective dated properties map of "propMap" field 304 correlates property type fields to a corresponding effective dating object, such as effective dating object 148 depicted in block form in FIG. 1, that maintains an ordered collection, such as ordered collection 158 depicted in block form in FIG. 1, for locating different values, such as value 160 depicted in block form in FIG. 1, that are in effect over access context 146, depicted in block form in FIG. 1.

In one illustrative example, attempted access to field "first name" of fields 208 indicated by indicator 218 causes a map lookup within the effective dated properties map of "prop-Map" field 304 for a corresponding field name. Based on the map lookup, effective dater 144 redirects access to, by finding or lazily creating, object 308. As depicted, object 308 is "effective dated property." Object 308 is an object, such as effective dating object 148 depicted in block form in FIG. 1. A value, such as value 160 is retrieved from a corresponding field object, such as field object 152 that holds the value that is in effect for the field "first name" of fields 208 according to the access context.

"CollMap" field 306 provides a map for determining effective dated values of collection type fields, such as at least one of collection type fields of fields 208 and fields 214. Effective dated collections map of "collMap" field 306 correlates collection type fields to a corresponding effective dating object, such as effective dating object 150 depicted in block form in FIG. 1, that maintains an ordered collection, such as ordered collection 162 depicted in block form in FIG. 1, for locating different values, such as value 160 depicted in block form in FIG. 1, that are in effect over access context 146, depicted in block form in FIG. 1.

In one illustrative example, attempted access to the field "dependents" of fields 208 indicated by indicator 218 causes a map lookup within the effective dated collections map of "collMap" field 306 for a corresponding field name. Based on the map lookup, effective dater 144 redirects access to, by finding or lazily creating, object 310. As depicted, object 310 is "effective dated collection." Object 310 is a collection object, such as collection object 156 depicted in block form in FIG. 1. Member objects, such as member objects 164 depicted in block form in FIG. 1, for a single collection type fields, such as at least one collection type field of fields 208 and fields are identified for a corresponding collection object, such as collection object 156 that maintains membership in the collection according to the particular access context.

When accessed according to a particular access context, such as access context 146 depicted in block form in FIG. 1, effective dater 144 establishes current date range. Effective dated objects, such as effective dating object 148 indicated in block form in FIG. 1, look to a date range established by access context 146 to select the value or set of values, such as one or more of values 160 depicted in block form in FIG. 1, to operate on. Effective dated objects such as effective dating object 150, indicated in block form in FIG. 1, look to the date range established by access context 146 to identify one or more of member objects 164, indicated in block form in FIG. 1, that are in effect for the effective dated collection during the date range established by access context 146.

When all mutable state is indicated by an indicator, such as one of indicator 218, effective dated objects, such as effective dating object 148 and effective dating object 150 depicted in block form in FIG. 1, act in concert to generate a fully effective dated data model that faithfully presents value 160 and member objects 164 in effect for a particular access context, at any time in the past, present, or future, based on latest information.

Figure 4:
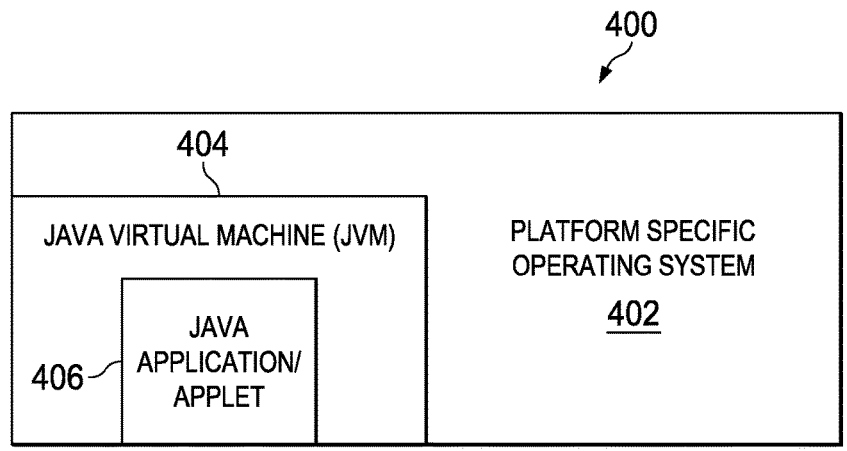
FIG. 4 is a block diagram illustrating the relationship of software components operating within a computer system that may implement an effective dater depicted in accordance with an illustrative embodiment.

With reference now to FIG. 4, a block diagram illustrating the relationship of software components operating within a computer system that may implement effective dater 144 of FIG. 1 of the present invention. Java-based system 400 contains platform specific operating system 402 that provides hardware and system support to software executing on a specific hardware platform. Java™ Virtual Machine (JVM™) 404 is one software application that may execute in conjunction with the operating system. JVM™ 404 provides a Java™ run-time environment with the ability to execute Java™ application or applet 406, which is a program, servlet, or software component written in Java™ programming language. In this illustrative example, JVM™ 404 operates on computer system 166, as described above, to implement effective dater 144, depicted in block form in FIG. 1. However, JVM™ 404 may be implemented in dedicated hardware on a so-called Java™ chip, Java™-on-silicon, or Java™ processor with an embedded pico Java™ core.

At the center of a Java™ run-time environment is the JVM™, which supports all aspects of Java™'s environment, including its architecture, security features, mobility across networks, and platform independence. The JVM™ is a virtual computer component that actually executes Java™ programs. Java™ programs are not run directly by the central processor but instead by the JVM™, which is itself a piece of software running on the processor. The JVM™ allows Java™ programs to be executed on a different platform as opposed to only one platform for which the code was compiled. Java™ programs are compiled for the JVM™. In this manner, Java™ is able to support applications for many types of data processing systems, which may contain a variety of central processing units and operating system architectures.

To enable a Java™ application to execute on different types of data processing systems, a compiler typically generates an architecture-neutral file format—the compiled code is executable on many processors, given the presence of the Java™ run-time system. The Java™ compiler generates bytecode instructions that are nonspecific to a particular computer architecture.

A bytecode is a machine independent code generated by the Java™ compiler and executed by a Java™ interpreter. A Java™ interpreter is part of the JVM™ that alternately decodes and interprets the bytecode or bytecodes. The bytecode instructions are designed to be easy to interpret on any computer and easily translated on the fly into native machine code. Bytecodes may be translated into native machine code by a just-in-time compiler or JIT.

The JVM™ loads the class files and executes the bytecodes within them. The class files are loaded by a class loader in the JVM™. The class loader loads class files from an application and the class files from the Java™ application programming interfaces (APIs) which are needed by the application. The execution engine that executes the bytecodes may vary across platforms and implementations.

One type of software-based execution engine is the just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java™ bytecodes are executed natively. JVM™s usually interprets bytecodes but JVM™s may also use other techniques, such as just-in-time compiling, to execute bytecodes.

When an application is executed on the JVM™ that is implemented in software on a platform-specific operating system, a Java™ application may interact with the host operating system by invoking native methods. A Java™ method is written in the Java™ language, compiled to bytecodes, and stored in class files. A native method is written in some other language and compiled to the native machine code of a particular processor. Native methods are stored in a dynamically linked library whose exact form is platform specific.

Figure 5:
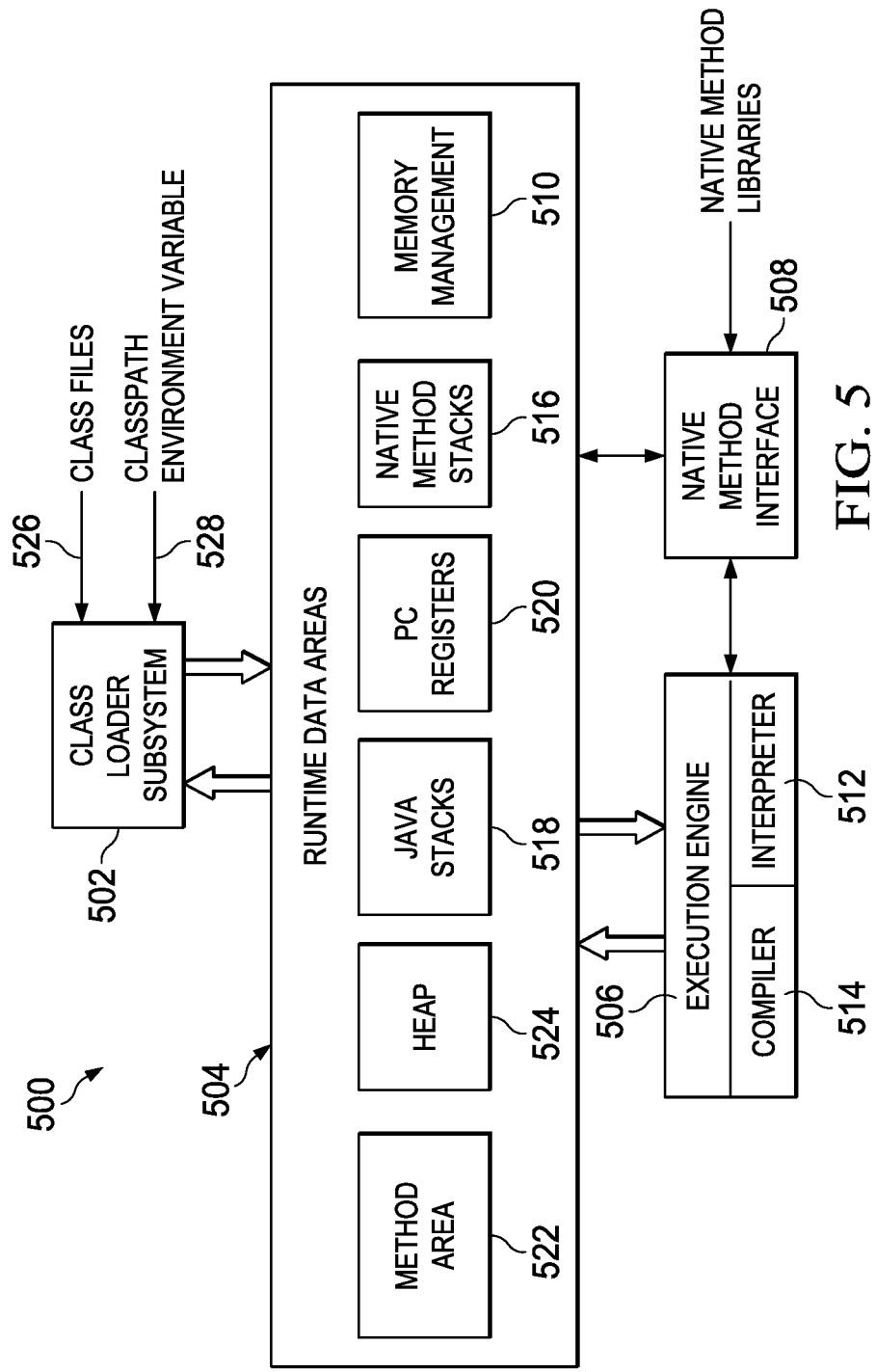
FIG. 5 is a block diagram of a Java virtual machine depicted in accordance with an illustrative embodiment.

With reference now to FIG. 5, a block diagram of a JVM™ is depicted in accordance with an illustrative embodiment of the present invention. JVM™ 500 includes class loader subsystem 502, which is a mechanism for loading types, such as classes and interfaces given fully qualified names. JVM™ 500 also contains runtime data areas 504, execution engine 506, native method interface 508, and memory management 510. Execution engine 506 is a mechanism for executing instructions contained in methods of classes loaded by class loader subsystem 502. Execution engine 506 may be, for example, Java™ interpreter 512 or compiler 514. Native method interface 508 allows access to resources in the underlying operating system. Native method interface 508 may be, for example, the Java™ Native Interface (JNI).

Runtime data areas 504 contain native method stacks 516, Java™ stacks 518, program counter (PC) registers 520, method area 522, and heap 524. These different data areas represent the organization of memory needed by JVM™ 500 to execute a program.

Java™ stacks 518 are used to store the state of Java™ method invocations. When a new thread is launched, the JVM™ creates a new Java™ stack for the thread. The JVM™ performs only two operations directly on Java™ stacks: it pushes and pops frames. The thread's Java™ stack stores the state of Java™ method invocations for the thread. The state of the Java™ method invocation includes its local variables, the parameters with which it was invoked, its return value, if any, and intermediate calculations. Java™ stacks are composed of stack frames. A stack frame contains a state of a single Java™ method invocation. When a thread invokes a method, the JVM™ pushes a new frame onto the Java™ stack of the thread. When the method completes, the JVM™ pops the frame for that method and discards it. The JVM™ does not have any registers for holding intermediate values; any Java™ instruction that requires or produces an intermediate value uses the stack for holding the intermediate values. In this manner, the Java™ instruction set is well defined for a variety of platform architectures.

Program counter (PC) registers 520 are used to indicate the next instruction to be executed. Each instantiated thread gets its own PC register and Java™ stack. If the thread is executing a JVM™ method, the value of the PC register indicates the next instruction to execute. If the thread is executing a native method, then the contents of the PC register are undefined.

Native method stacks 516 store the state of invocations of native methods. The state of native method invocations is stored in an implementation-dependent way in native method stacks, registers, or other implementation-dependent memory areas. In some JVM™ implementations, native method stacks 516 and Java™ stacks 518 are combined.

Method area 522 contains class data while heap 524 contains all instantiated objects. The constant pool is located in method area 522 in these examples. The JVM™ specification strictly defines data types and operations. Most JVM™s choose to have one method area and one heap, each of which are shared by all threads running inside the JVM™, such as JVM™ 500. When JVM™ 500 loads a class file, it parses information about a type from the binary data contained in the class file. JVM™ 500 places this type of information into the method area. Each time a class instance or array is created, the memory for the new object is allocated from heap 524. JVM™ 500 includes an instruction that allocates memory space within the memory for heap 524 but does not include instructions for freeing space within the memory. Memory management 510 in the depicted example manages memory space within the memory allocated to heap 524. Memory management 510 may include a garbage collector, which automatically reclaims memory used by objects that are not referenced. Additionally, a garbage collector also may move objects to reduce heap fragmentation.

Currently, a Java™ class loader in class loader subsystem 502 loads class files 526 in order to execute a Java™ program. The Java™ class loader identifies class files 526 that are required by the Java™ program by traversing classpath environment variable 528. Classpath environment variable 528 tells the Java™ class loader in JVM™ 500 where to find class files 526, including user-defined class files to load. The Java™ class loader traverses the classpath environment variable and examines all of the directories or JAR files in the classpath environment variable to determine if the required class files are present.

Figure 6:
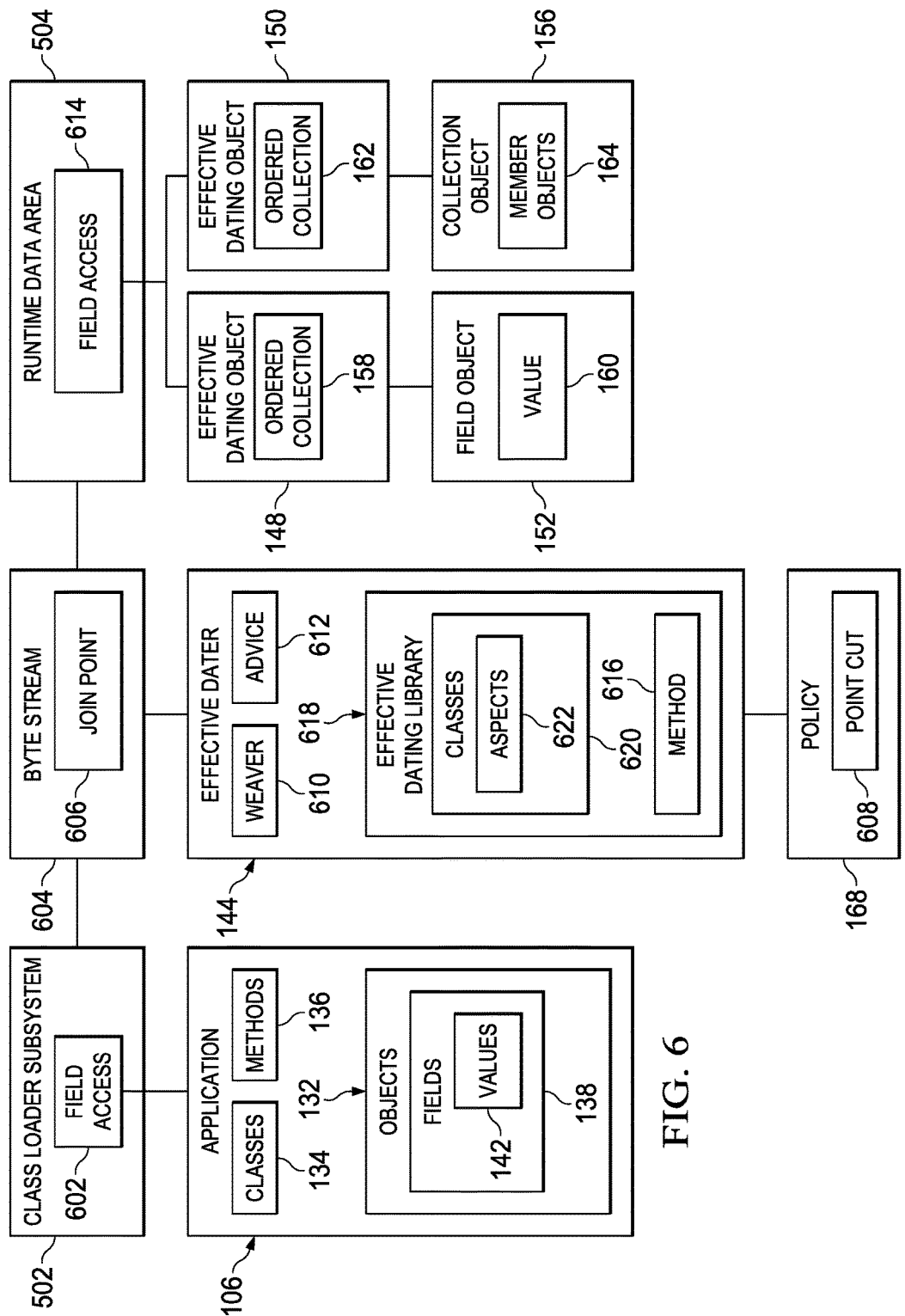
FIG. 6 is an illustration of a block diagram of a data flow for providing effective dating in a runtime environment depicted in accordance with an illustrative embodiment.

With reference next to FIG. 6, an illustration of a block diagram of a data flow for providing effective dating in the runtime environment is depicted in accordance with an illustrative embodiment. In this figure, an example of data flow for effective dating information in application 106 by diverting field access 602 from object 132 to at least one of effective dating object 148 and effective dating object 150. In the illustrative examples, the same reference numeral may be used in more than one figure. This reuse of a reference numeral in different figures represents the same element in the different figures.

During runtime of application 106, class loader subsystem 502 loads class files 526, as depicted in FIG. 5, including methods 136 and classes 134 for creation of objects 132, that are necessary for the execution of application 106. Class loader subsystem 502 identifies class files 526 that are required by the Java™ program by traversing classpath environment variable 528, as depicted in FIG. 5. Classpath environment variable 528 tells the Java™ class loader in JVM™ 500 where to find class files 526, including user-defined class files to load. The Java™ class loader traverses the classpath environment variable and examines all of the directories or JAR files in the classpath environment variable to determine if the required class files are present. Class files 526, depicted in block form in FIG. 5, are then loaded into byte stream 604 for execution in runtime data areas 504, depicted in block form in FIG. 5.

Effective dater 144 examines byte stream 604 to identify well-defined points in the program flow indicating access to fields 138 of objects 132. As depicted, a well-defined point in the program flow is indicated as join point 606, identifying access to field 138 of objects 132.

Effective dater 144 applies a group of rules in policy 168 to join point 606. Effective dater 144 determines whether access to fields 138 of objects 132 should be rerouted to effective dating object 148 based on the results of applying the group of rules in policy 168 to join point 606.

As depicted, one rule in policy 168 may specify point cut 608 when join point 606 is indicated by an indicator, such indicator 218 of FIG. 2. Point cut 608 picks out values within byte stream 604 at join point 606 and exposes part of the execution context at join point 606. In one illustrative example, point cut 608 may be specified based on explicit enumeration of effective dated fields 138. In another illustrative example, point cut 608 may be specified in terms of properties of method 136.

When join point 606 is indicated by an indicator, and therefore meets policy 168, weaver 610 alters field access 602 loaded into byte stream 604 according to advice 612 to generate field access 614. Advice 612 is code injected into byte stream 604 when join point 606 meeting policy 168 is identified. Weaver 610 is a utility within effective dater 144 that integrates instructions specified by advice 612 into byte stream 604 to create field access 614.

Field access 614 is a field access that has been redirected to one of effective dating object 148 or effective dating object 150. In this illustrative example, when field access 614 is encountered during runtime, application 106 locates at least one of effective dating object 148 or effective dating object 150. Class loader subsystem 502 then loads method 616 and any class 620 required to implement effective dating object 150 from effective dating library 618 into runtime data area 504.

As depicted, classes 620 includes aspect 622. Aspect 622 is a class, such as class 302 of FIG. 3, that provides a unit of modularity for crosscutting concerns for the implementation of effective dating. In this illustrative example, effective dating object 148 and effective dating object 150 are accessed via an instance of aspect 622, such as class 302 depicted in block form in FIG. 3.

Field access 614 is loaded into runtime data area 504. During runtime of application 106, field access 614 diverts calls to method 616 that would otherwise access fields 138. In this manner, effective dater 144 can implement effective dating object 148 and effective dating object 150 to replace objects 132 that do not provide effective dating. Effective dater 144 can therefore maintain different values 160 in different ones of field object 152 and different member objects 164 in different ones of collection objects 156 that accurately reflect object state at a particular point in time according to the access context.

Figure 7:
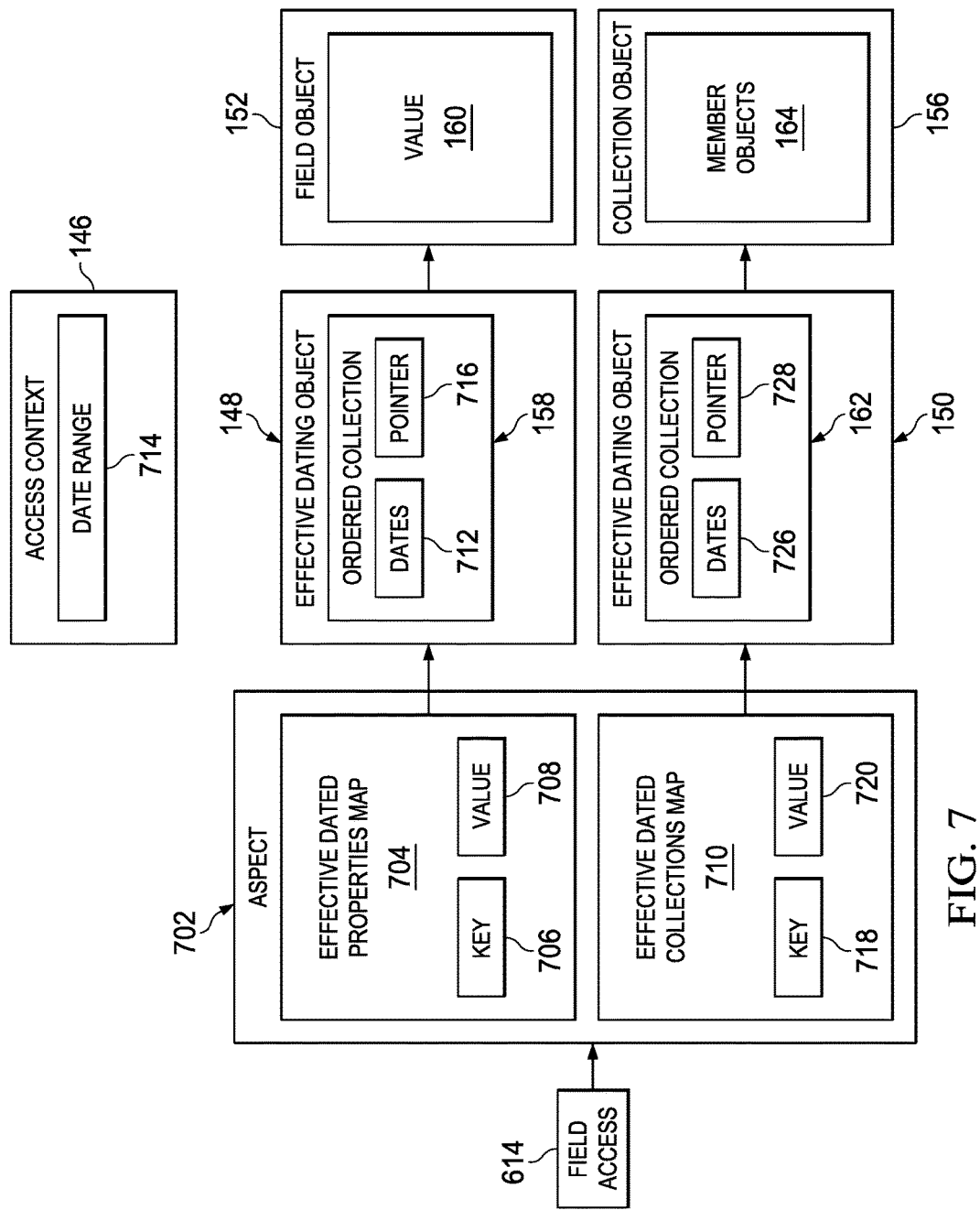
FIG. 7 is an illustration of a block diagram of a data flow for finding and creating effective dated objects in a runtime environment depicted in accordance with an illustrative embodiment.

With reference next to FIG. 7, an illustration of a block diagram of a data flow for finding and creating effective dated objects in the runtime environment is depicted in accordance with an illustrative embodiment. In this figure, an example of data flow for finding and creating effective dated objects, such as effective dating object 148, in application 106, as depicted in block form in FIG. 1. In the illustrative examples, the same reference numeral may be used in more than one figure. This reuse of a reference numeral in different figures represents the same element in the different figures.

As depicted, method 616 of FIG. 6 includes field access 614. In this illustrative example, field access 614 can be an access that retrieves or sets the value of a field according to access context 146, such as value 160 of field object 152. Alternatively, field access 614 can be in access that retrieves or mutates member objects in a collection, such as member objects 164 of collection objects 156.

Field access 614 initially is directed to aspect 702. Aspect 702 is an instance of aspect 622, shown in block form in FIG. 6.

As depicted, aspect 702 includes effective dated properties map 704. Effective dated properties map 704 is an object that maps a set of keys 706 to a corresponding set of values 708. In this illustrative example, effective dated properties map 704 is an example of an effective dated properties map provided by "propMap" field 304 of FIG. 3.

In the illustrative example, a map lookup within effective dated properties map 704 of key 706 is performed based on a field name for a corresponding object, which can be object identifier 206 of FIG. 2. As depicted, key 706 is mapped to value 708. Value 708 indicates effective dating object 148.

Effective dating object 148 is an object that maintains values stores values 160 of effective dated field 138. In an illustrative example, effective dated object 148 comprises ordered collection 158. Ordered collection 158 comprises a list of dates 712 indicating when value 706 of effective dated field 138 is valid. When ordered collection 158 is traversed according to date range 714 of access context 146, pointer 716 indicates effective dated field 138, storing value 706 for an object state that existed during the date range as indicated by access context 146.

As depicted, aspect 702 includes effective dated collections map 710. Effective dated collections map 710 is an object that maps a set of keys 718 to a corresponding set of values 720. In this illustrative example, effective dated collections map 710 is an example of an effective dated collections map provided by "collMap" field 306 of FIG. 3.

In the illustrative example, a map lookup within effective dated collections map 710 of key 718 is performed based on a field name for a corresponding object, which can be object identifier 206 of FIG. 2. As depicted, key 718 is mapped to value 720. Value 720 indicates effective dating object 150.

In an illustrative example, effective dating object 150 comprises ordered collection 162. Ordered collection 162 comprises is a list of dates 726 indicating a particular collection object 156. When ordered collections 724 is traversed according to date range 714 of access context 146, pointer 728 indicates collection object 156 having member objects 164 that are in effect for date range 714.

Figure 8:
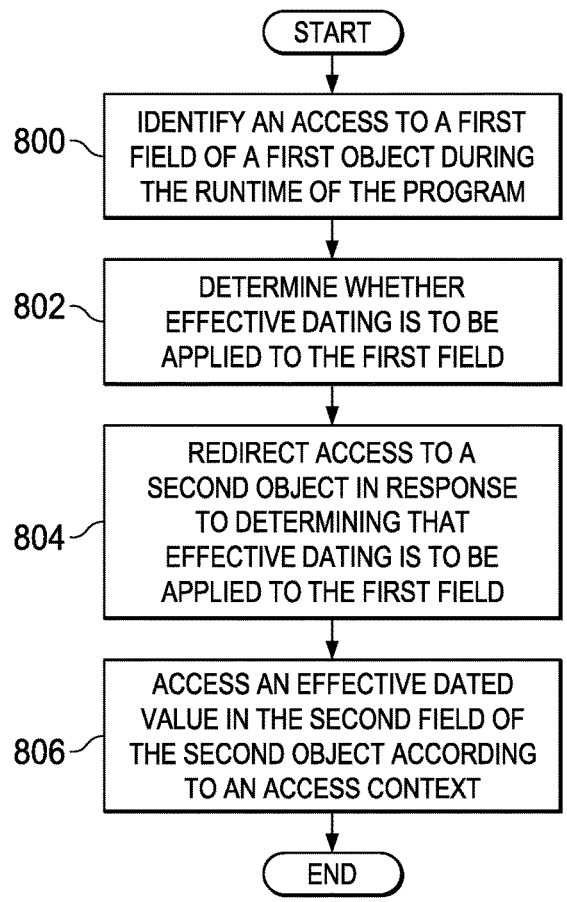
FIG. 8 is an illustration of a flowchart of a process for providing effective dating to an object in a runtime environment depicted in accordance with an illustrative embodiment.

Turning next to FIG. 8, an illustration of a flowchart of a process for providing effective dating to the object in a runtime environment is depicted in accordance with an illustrative embodiment. The process illustrated in FIG. 8 may be implemented in effective dating environment 100 shown in block form in FIG. 1. This process may be used to enable operations for organization 108. In particular, the process may be implemented in effective dater 144 in computer system 166.

The process begins by identifying an access to the first field of a first object during a runtime of a program (step 800). The first object is not effective date enabled, and can be an object such as object 132 of FIG. 1.

The process then determines whether effective dating is to be applied to the first field (step 802). In an illustrative embodiment, effective dating is applied when a well-defined point in the program flow, such as join point 606 is specified by one or more rules indicating that access to the first field should be redirected to an effective dating object. In an illustrative embodiment, the rule may specify a point cut that is indicated by a particular indicator, such as point cut 608.

Responsive to determining that effective dating is to be applied to the first field, the process redirects access to a second object (step 804). The second object is effective date enabled. In an illustrative embodiment, the process redirects access by augmenting a byte stream, such as byte stream 604, to produce an field access directed to the second object. The field access can be, for example, field access 614 of FIG. 6.

The process then accesses an effective dated value in a second field of the second object according to an access context (step 806), with the process terminating thereafter. In this manner, performing an action in the organization based on effective dating of objects in a runtime environment is enabled.

Figure 9:
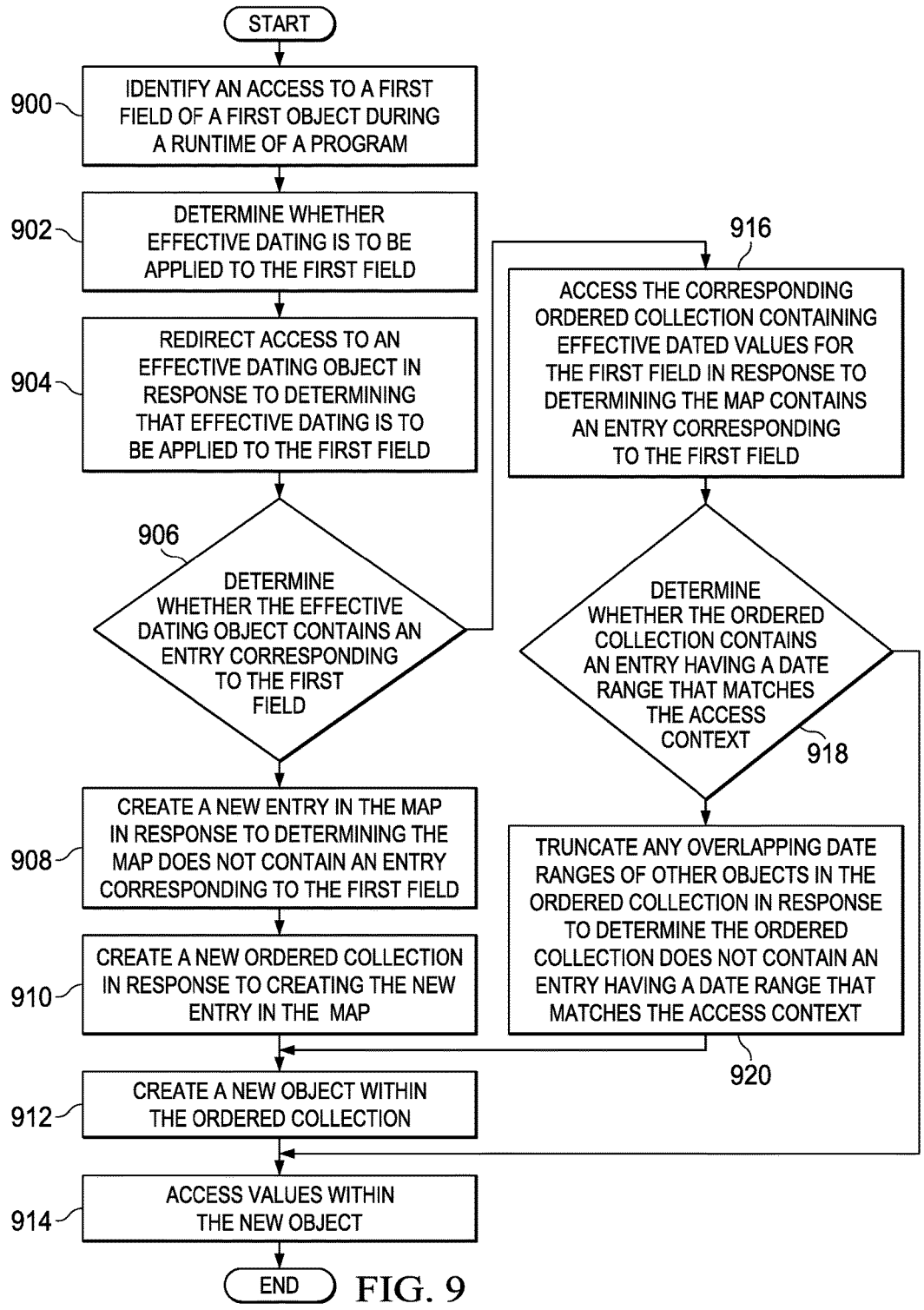
FIG. 9 is an illustration of a flowchart of a process for providing effective dating to an object in a runtime environment depicted in accordance with an illustrative embodiment.

Turning next to FIG. 9, an illustration of a more detailed flowchart of a process for providing effective dating to the object in a runtime environment is depicted in accordance with an illustrative embodiment. The process illustrated in FIG. 9 may be implemented in effective dating environment 100 shown in block form in FIG. 1. This process may be used to enable operations for organization 108. In particular, the process may be implemented in effective dater 144 in computer system 166.

The process begins by identifying an access to the first field of a first object during a runtime of a program (step 900). The first object is not effective date enabled, and can be an object such as object 132 of FIG. 1.

The process then determines whether effective dating is to be applied to the first field (step 902). In an illustrative embodiment, effective dating is applied when a well-defined point in the program flow, such as join point 606 is specified by one or more rules indicating that access to the first field should be redirected to an effective dating object. In an illustrative embodiment, the rule may specify a point cut that is indicated by a particular indicator, such as point cut 608.

Responsive to determining that effective dating is to be applied to the first field, the process redirects access to an effective dating object (step 904). The effective dating object is effective date enabled. In an illustrative embodiment, the process redirects access by augmenting a byte stream, such as byte stream 604, to produce an access to the effective dating object. The field access can be, for example, field access 614 of FIG. 6. The effective dating object can be, for example, effective dating object 148, depicted in block form in FIG. 1.

The process then determines whether the effective dating object contains an entry corresponding to the first field (step 906). The entry corresponding to the first field can be an object contained within one of a map for determining effective dated values for a map for determining effective dated collections.

Responsive to determining that the map does not contain an entry corresponding to the first field ("no" at step 906), the process creates a new entry in the map (step 908). The new entry in the map points to a new ordered collection for containing effective dated values for the first field. The new ordered collection can be, for example in order collection such as ordered collection 162, depicted in block form in FIG. 1.

Responsive to creating a new entry in the map, the process creates the new ordered collection (step 910). The new ordered collection for containing effective dated values for the first field. The process creates a new object within the ordered collection (step 912), and accesses values within the new object (step 914), with the process terminating thereafter. In this illustrative example, the process accesses values by setting a value in the new object.

Returning now to step 906, responsive to determining that the map contain an entry corresponding to the first field ("yes" at step 906), the process accesses the corresponding ordered collection containing effective dated values for the first field (step 916). The corresponding ordered collection can be, for example an ordered collection such as ordered collection 162, depicted in block form in FIG. 1.

The process then determines whether the ordered collection contains an entry having a date range that matches the access context (step 918). Responsive to determining that the ordered collection does not contain an entry having a date range that matches the access context ("no" at step 918), the process truncates any overlapping date ranges of other objects in the ordered collection (step 920). The process creates a new object within the ordered collection according to the access context (step 912), and accesses values within the new object (step 914). The process terminates thereafter.

Returning now to step 918, responsive to determining that the ordered collection includes an entry having a date range that matches the access context ("yes" at step 920), the process accesses values within the corresponding object (step 914), with the process terminating thereafter. In this manner, performing an action in the organization based on effective dating of objects in a runtime environment is enabled.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
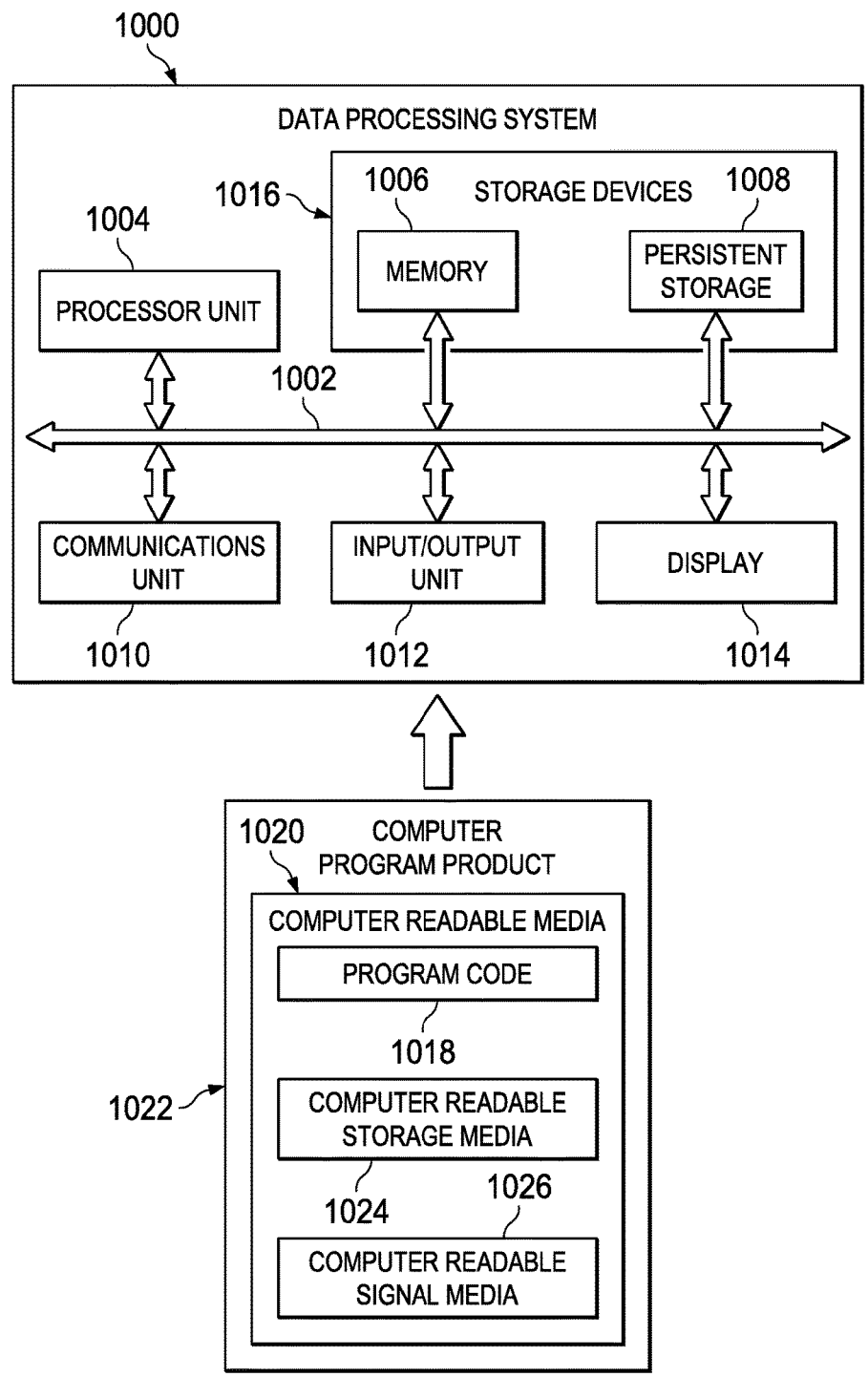
FIG. 10 is an illustration of a block diagram of a data processing system depicted in accordance with an illustrative embodiment.

Turning now to FIG. 10, an illustration of a block diagram of a data processing system is depicted in accordance with an illustrative embodiment. Data processing system 1000 may be used to implement computer system 166 in FIG. 1. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these illustrative examples. In one example, computer readable media 1020 may be computer readable storage media 1024 or computer readable signal media 1026.

In these illustrative examples, computer readable storage media 1024 is a physical or tangible storage device used to store program code 1018 rather than a medium that propagates or transmits program code 1018. Alternatively, program code 1018 may be transferred to data processing system 1000 using computer readable signal media 1026. Computer readable signal media 1026 may be, for example, a propagated data signal containing program code 1018. For example, computer readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

Thus, the illustrative examples in the different figures provide one or more technical solutions to overcome a technical problem of defective dating of information within applications and legacy applications that make for the efficient performance of operations in an information system more cumbersome and time-consuming than desired. For example, effective dater 144 enables effective dating of objects in a runtime environment when a identifier that has a code signature or annotation matching one or more rules in policy 168. Effective dater 144 enables the diverging of field accesses to effective date fields 138 only when that code signature or annotation meets one or more rules in policy 168 defining which of information 104 should be effective dated.

In this manner, the use of effective dater 144 has a technical effect of reducing time, effort, or both in providing effective dating for application 106. In this manner, operation 118 performed for organization 108 may be performed more efficiently as compared to currently used systems. For example, object 148 may be used to store effective dated fields 138, enabling more efficient performance of operation 118, selected from at least one of hiring, benefits administration, payroll, performance reviews, forming teams for new products, assigning research projects, or other suitable operations for organization 108.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for providing effective dating to objects in a runtime environment, the method comprising:
   identifying a join point in a byte stream that indicates an access to a first field of a first object during runtime of a program, wherein the first object is not effective date enabled to simultaneously store different values for the first field that are in effect over different date ranges;
   identifying a pointcut expression that matches the join point;
   determining if the pointcut expression indicates that effective dating is to be applied to the first field;
   responsive to determining that the pointcut expression indicates that effective dating is to be applied to the first field, integrating instructions into the byte stream that redirect the access to a second object, wherein the second object is effective date enabled to simultaneously store different values that are in effect for a second field over different date ranges; and accessing an effective dated value in the second field of the second object according to an access context that indicates a date range for the effective dated value.

2. The method of claim 1, wherein the access to the first field comprises:
a read access to a value of the first field; or
an assignment to the value of the first field.

3. The method of claim 2, wherein the step of determining if effective dating is to be applied to the field further comprises:
determining whether the first object contains a field that is to be effective dated.

4. The method of claim 3, further comprising:
the step of identifying the access to the first field comprises a pointcut identifying a join point, wherein the join point is a read access to a value of the first field or an assignment to the value of the first field.

5. The method of claim 1, wherein the step of redirecting the access to the second object further comprises:
identifying the first field as a property or a collection;
responsive to identifying the first field as a property, redirecting the access to the second object according to a first map lookup of the first field in first map; and
responsive to identifying the first field as a collection, redirecting the access to the second object according to a second map lookup of the first field in a second map.

6. The method of claim 5, wherein a field name for the first field defines a lookup key for redirecting the access to the second object according to at least one of the first map lookup and the second map lookup.

7. The method of claim 1, wherein the step of accessing the effective dated value in a second field of the second object according to an access context further comprises:
identifying the effective dated value in an ordered collection of values for the second field according to the access context.

8. The method of claim 7, wherein the step of accessing the effective dated value in a second field of the second object according to an access context further comprises:
establishing a date range over which the effective dated value is identified in the ordered collection.

9. A computer system comprising:
a processor; and
an effective dater in communication with the processor, wherein the effective dater: identifies a join point in a byte stream that indicates an access to a first field of a first object during runtime of a program, wherein the first object is not effective date enabled to simultaneously store different values for the first field that are in effect over different date ranges; identifies a pointcut expression that matches the join point; determines if the pointcut expression indicates that effective dating is to be applied to the first field; responsive to determining that the pointcut expression indicates that effective dating is to be applied to the first field, integrates instructions into the byte stream that redirect the access to a second object, wherein the second object is effective date enabled to simultaneously store different values that are in effect for a second field over different date ranges; and accesses an effective dated value in the second field of the second object according to an access context that indicates a date range for the effective dated value.

10. The computer system of claim 9, wherein the access to the first field comprises:
a read access to a value of the first field; or
an assignment to the value of the first field.

11. The computer system of claim 10, wherein the step of determining if effective dating is to be applied to the field further comprises:
determining, by the effective dater, whether the first object contains a field that is to be effective dated.

12. The computer system of claim 11, wherein:
the effective dater identifying the access to the first field a pointcut identifying a join point, wherein the join point is a read access to a value of the first field or an assignment to the value of the first field.

13. The computer system of claim 9, wherein the step of redirecting the access to the second object further comprises:
identifying, by the effective dater, the first field as a property or a collection;
responsive to identifying the first field as a property, redirecting, by the effective dater, the access to the second object according to a first map lookup of the first field in first map; and
responsive to identifying the first field as a collection, redirecting, by the effective dater, the access to the second object according to a second map lookup of the first field in a second map.

14. The computer system of claim 13, wherein a field name for the first field defines a lookup key for redirecting the access to the second object according to at least one of the first map lookup and the second map lookup.

15. The computer system of claim 9, wherein accessing the effective dated value in a second field of the second object according to an access context further comprises:
identifying, by the effective dater, the effective dated value in an ordered collection of values for the second field according to the access context.

16. The computer system of claim 15, wherein accessing the effective dated value in a second field of the second object according to an access context further comprises:
establishing, by the effective dater, a date range over which the effective dated value is identified in the ordered collection.

17. A computer program product for providing effective dating to objects in a runtime environment, the computer program product comprising:
a computer readable storage media;
program code, stored on the computer readable storage media, for identifying a join point in a byte stream that indicates an access to a first field of a first object during runtime of a program, wherein the first object is not effective date enabled to simultaneously store different values for the first field that are in effect over different date ranges;
program code, stored on the computer readable storage media, for identifying a pointcut expression that matches the join point;
program code, stored on the computer readable storage media, for determining if the pointcut expression indicates that effective dating is to be applied to the first field;
program code, stored on the computer readable storage media, for integrating instructions into the byte stream that redirect the access to a second object in response to determining that the pointcut expression indicates that effective dating is to be applied to the first field, wherein the second object is effective date enabled simultaneously store different values that are in effect for a second field over different date ranges; and
program code, stored on the computer readable storage media, for accessing an effective dated value in the second field of the second object according to an access context that indicates a date range for the effective dated value.

18. The computer program product of claim 17, wherein the access to the first field comprises:
   a read access to a value of the first field; or
   an assignment to the value of the first field.

19. The computer program product of claim 18, wherein the program code for determining if effective dating is to be applied to the field further comprises:
   program code, stored on the computer readable storage media, for determining whether the first object contains a field that is to be effective dated.

20. The computer program product of claim 19, wherein the program code for identifying the access to the first field comprises:
   program code, stored on the computer readable storage media, for identifying a pointcut identifying a join point, wherein the join point is a read access to a value of the first field or an assignment to the value of the first field.

21. The computer program product of claim 17, wherein the program code for redirecting the access to the second object further comprises:
   program code, stored on the computer readable storage media, for identifying the first field as a property or a collection;
   program code, stored on the computer readable storage media, for redirecting the access to the second object according to a first map lookup of the first field in first map in response to identifying the first field as a property; and
   program code, stored on the computer readable storage media, for redirecting the access to the second object according to a second map lookup of the first field in a second map in response to identifying the first field as a collection.

22. The computer program product of claim 21, wherein a field name for the first field defines a lookup key for redirecting the access to the second object according to at least one of the first map lookup and the second map lookup.

23. The computer program product of claim 17, wherein the program code for accessing the effective dated value in a second field of the second object according to an access context further comprises:
   program code, stored on the computer readable storage media, for identifying the effective dated value in an ordered collection of values for the second field according to the access context.

24. The computer program product of claim 23, wherein the program code for accessing the effective dated value in a second field of the second object according to an access context further comprises:
   program code, stored on the computer readable storage media, for establishing a date range over which the effective dated value is identified in the ordered collection.

* * * * *